United States Patent
Hittel et al.

(10) Patent No.: US 10,097,443 B2
(45) Date of Patent: Oct. 9, 2018

(54) SYSTEM AND METHOD FOR SECURE COMMUNICATIONS BETWEEN A COMPUTER TEST TOOL AND A CLOUD-BASED SERVER

(71) Applicant: Fluke Corporation, Everett, WA (US)

(72) Inventors: John Paul Hittel, Scottsdale, AZ (US); Clinton J. Wooton, Lake Stevens, WA (US)

(73) Assignee: Fluke Corporation, Everett, WA (US)

( * ) Notice: Subject to any disclaimer, the term of this patent is extended or adjusted under 35 U.S.C. 154(b) by 74 days.

(21) Appl. No.: 14/971,806

(22) Filed: Dec. 16, 2015

(65) Prior Publication Data

US 2017/0180239 A1 Jun. 22, 2017

(51) Int. Cl.
*H04L 12/26* (2006.01)
*G06F 12/0802* (2016.01)
(Continued)

(52) U.S. Cl.
CPC .......... *H04L 43/50* (2013.01); *G06F 12/0802* (2013.01); *G06F 21/64* (2013.01); *H04L 9/14* (2013.01); *H04L 9/30* (2013.01); *H04L 63/0428* (2013.01); *H04L 63/0442* (2013.01); *H04L 63/06* (2013.01); *H04W 12/04* (2013.01); *G06F 2212/154* (2013.01); *G06F 2212/60* (2013.01); *G08C 2201/93* (2013.01); *H04L 2209/80* (2013.01); *H04Q 2209/25* (2013.01);
(Continued)

(58) Field of Classification Search
CPC ........................................ H04L 9/63
USPC ........................................ 713/150
See application file for complete search history.

(56) References Cited

U.S. PATENT DOCUMENTS 5,311,516 A * 5/1994 Kuznicki .............. H04L 7/0331
340/7.35
6,041,355 A * 3/2000 Toga ................. G06F 17/30867
707/E17.109
(Continued)

FOREIGN PATENT DOCUMENTS

EP 2 627 041 A2 8/2013
WO 2014/145168 A1 9/2014
WO 2014/161003 A1 10/2014

OTHER PUBLICATIONS

Microsoft Support Center (https://support.office.com/en-us/article/Turn-on-Cached-Exchange-Mode-7885af08-9a60-4ec3-850a-e221c1ed0c1c#ID0EAABAAA=2007_.*
(Continued)

*Primary Examiner* — Taghi Arani
*Assistant Examiner* — Badri Champakesan
(74) *Attorney, Agent, or Firm* — Seed IP Law Group LLP

(57) ABSTRACT

A system for providing data communication is provided. The system includes at least one computer test tool configured to perform one or more diagnostic tests on a computer network. The system further includes at least one communication device configured to couple to the at least one computer test tool to receive and cache test data from the at least one computer test tool and to wirelessly couple to a communication network. In addition, the system includes a cloud-based server configured to couple to the communication network so as to receive test data transmitted from the at least one communication device wherein the test data is encrypted in the at least one computer test tool and decrypted in the cloud-based server.

18 Claims, 9 Drawing Sheets

(51) Int. Cl.
*H04L 9/14* (2006.01)
*H04L 9/30* (2006.01)
*H04L 29/06* (2006.01)
*H04W 12/04* (2009.01)
*G06F 21/64* (2013.01)

(52) U.S. Cl.
CPC ..... *H04Q 2209/40* (2013.01); *H04Q 2209/43* (2013.01); *H04Q 2209/50* (2013.01); *H04Q 2209/86* (2013.01)

(56) References Cited

U.S. PATENT DOCUMENTS

| | | | |
|---|---|---|---|
| 6,496,014 B1 | 12/2002 | Cook | |
| 6,823,479 B1* | 11/2004 | McElhaney, Jr. | H04L 43/50 714/4.2 |
| 6,847,213 B2 | 1/2005 | Renken et al. | |
| 7,024,548 B1 | 4/2006 | O'Toole, Jr. | |
| 7,181,017 B1* | 2/2007 | Nagel | H04L 9/0825 380/282 |
| 7,457,866 B1 | 11/2008 | Hackworth et al. | |
| 7,479,776 B2 | 1/2009 | Renken et al. | |
| 7,502,850 B2 | 3/2009 | Fellenstein et al. | |
| 7,623,784 B1 | 11/2009 | Pan et al. | |
| 7,720,940 B1 | 5/2010 | Wilsey et al. | |
| 7,860,115 B1* | 12/2010 | Scudder | H04L 45/00 370/229 |
| 8,174,996 B2 | 5/2012 | Omar | |
| 8,355,926 B1 | 1/2013 | Hinz et al. | |
| 8,813,228 B2* | 8/2014 | Magee | G06F 21/577 713/187 |
| 8,910,294 B1* | 12/2014 | Sennett | H04L 63/1433 726/25 |
| 8,935,765 B2 | 1/2015 | Morales | |
| 9,047,484 B2 | 6/2015 | Briere et al. | |
| 9,225,539 B2 | 12/2015 | Aguren | |
| 9,397,922 B1 | 7/2016 | Collins | |
| 9,400,301 B2 | 7/2016 | Kanne et al. | |
| 9,541,472 B2* | 1/2017 | Neeley | G01D 7/08 |
| 9,749,039 B1 | 8/2017 | Chen et al. | |
| 2002/0049962 A1 | 4/2002 | Kelbaugh et al. | |
| 2002/0144187 A1* | 10/2002 | Morgan | G06F 11/0748 714/43 |
| 2003/0134599 A1 | 7/2003 | Pangrac et al. | |
| 2003/0159001 A1* | 8/2003 | Chalmer | G06F 3/0601 711/120 |
| 2004/0015744 A1* | 1/2004 | Klotz | G06F 11/3414 714/43 |
| 2004/0113604 A1 | 6/2004 | Renken et al. | |
| 2004/0199342 A1 | 10/2004 | Graves et al. | |
| 2005/0140377 A1 | 6/2005 | Komatsu | |
| 2006/0005065 A1 | 1/2006 | Nakayama et al. | |
| 2006/0048200 A1 | 3/2006 | Jaworski et al. | |
| 2006/0064434 A1 | 3/2006 | Gilbert et al. | |
| 2006/0085322 A1 | 4/2006 | Crookshanks | |
| 2007/0195711 A1 | 8/2007 | Morris et al. | |
| 2007/0234410 A1* | 10/2007 | Geller | G06F 21/31 726/8 |
| 2008/0072050 A1* | 3/2008 | Klonover | H04L 43/50 713/176 |
| 2008/0208806 A1* | 8/2008 | Dalfo | G06F 17/30899 |
| 2008/0275714 A1 | 11/2008 | Martinez | |
| 2008/0300945 A1 | 12/2008 | Simpson et al. | |
| 2010/0150319 A1 | 6/2010 | Irenze et al. | |
| 2010/0304686 A1 | 12/2010 | Kennedy et al. | |
| 2010/0318929 A1 | 12/2010 | Hilton et al. | |
| 2011/0084132 A1* | 4/2011 | Tofighbakhsh | G06F 19/3418 235/380 |
| 2011/0103242 A1* | 5/2011 | Hittel | H04W 24/08 370/252 |
| 2013/0041613 A1 | 2/2013 | Bhide et al. | |
| 2013/0173962 A1* | 7/2013 | Li | G06F 11/3688 714/32 |
| 2013/0212207 A1* | 8/2013 | Ong | G06F 15/167 709/213 |
| 2013/0305091 A1 | 11/2013 | Stan et al. | |
| 2013/0318589 A1 | 11/2013 | Ford et al. | |
| 2014/0036065 A1* | 2/2014 | Oakley | G01S 3/46 348/135 |
| 2014/0047560 A1 | 2/2014 | Meyer et al. | |
| 2014/0281484 A1* | 9/2014 | Kurkowski | H04L 63/0471 713/153 |
| 2014/0281737 A1 | 9/2014 | Compann et al. | |
| 2014/0292348 A1 | 10/2014 | Kanne et al. | |
| 2014/0337674 A1* | 11/2014 | Ivancic | H04L 43/50 714/43 |
| 2015/0106616 A1* | 4/2015 | Nix | H04W 4/70 713/156 |
| 2015/0163206 A1 | 6/2015 | McCarthy et al. | |
| 2015/0195182 A1* | 7/2015 | Mathur | H04L 43/50 714/27 |
| 2015/0253379 A1* | 9/2015 | Lin | G01R 31/2834 702/118 |
| 2015/0256825 A1 | 9/2015 | Priest | |
| 2015/0278076 A1 | 10/2015 | BS et al. | |
| 2015/0316600 A1 | 11/2015 | Davis | |
| 2015/0350095 A1* | 12/2015 | Raney | H04L 47/2441 709/223 |
| 2015/0381467 A1* | 12/2015 | Girmonsky | H04L 43/50 709/224 |
| 2016/0048112 A1* | 2/2016 | Pandurangan | G05B 13/04 700/30 |
| 2016/0072693 A1* | 3/2016 | Michaelis | H04L 43/50 709/203 |
| 2016/0091549 A1 | 3/2016 | Snook et al. | |
| 2016/0124034 A1 | 5/2016 | Shoor et al. | |
| 2016/0301575 A1 | 10/2016 | Jau et al. | |
| 2016/0381123 A1 | 12/2016 | Kanne et al. | |
| 2017/0093684 A1* | 3/2017 | Jayaraman | H04L 43/50 |
| 2017/0094446 A1* | 3/2017 | Maggiore | H04W 4/008 |
| 2017/0104768 A1* | 4/2017 | Semenko | H04L 63/107 |
| 2017/0141966 A1* | 5/2017 | Hittel | H04L 41/14 |
| 2017/0142076 A1 | 5/2017 | Ford et al. | |
| 2017/0257365 A1 | 9/2017 | Gonzalez et al. | |
| 2017/0257376 A1* | 9/2017 | Dulkin | H04L 63/102 |

OTHER PUBLICATIONS

European Search Report for Application No. 16204801.1-1870, dated Mar. 29, 2017, 10 pages.
Extended European Search Report, dated Feb. 21, 2017, for European Application No. 16204813.6-1958, 6 pages.
International Search Report and Written Opinion, dated Jan. 16, 2017, for International Application No. PCT/US2016/056102, 12 pages.
International Search Report and Written Opinion, dated Jan. 24, 2017, for International Application No. PCT/US2016/057206, 13 pages.

* cited by examiner

SYSTEM AND METHOD FOR SECURE COMMUNICATIONS BETWEEN A COMPUTER TEST TOOL AND A CLOUD-BASED SERVER

FIELD OF THE INVENTION

The disclosed embodiments generally relates to a system and method for test equipment monitoring, and more particularly, to a secure system and method for communication between a computer test tool and a cloud-based server.

BACKGROUND OF THE INVENTION

Test equipment, e.g., a computer test tool, may be able to communicate with a cloud-based (also referred to as cloud-based) server. In some configurations the computer test tool and the server must both be coupled to the network at the same time in order to exchange data. However, the computer test tool may not have access to a network connection for exchanging data at a critical time during which data exchange is needed.

In order to provide access to the network, a mobile device, such as a mobile phone, tablet, or laptop, may be coupled to the computer test tool to gather and store data from the computer test tool and transmit the data to a server at a later time. However, an intruder can pose as the computer test tool or communication device and send fake or counterfeit diagnostic data to the server. In another scenario, an intruder may pose as the server or communication device and send fake or counterfeit control or configuration data to the computer test tool.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system for providing data communication is described. The system includes at least one computer test tool configured to perform one or more diagnostic tests on a computer network. The system further includes at least one communication device configured to couple to the at least one computer test tool to receive and cache test data from the at least one computer test tool and to wirelessly couple to a communication network. In addition, the system includes a cloud-based server configured to couple to the communication network so as to receive test data transmitted from the at least one communication device wherein the test data is encrypted in the at least one computer test tool and decrypted in the cloud-based server.

In embodiments, the test data can be encrypted using a private key associated with the at least one computer test tool and decrypted in the cloud-based server using a public key associated with the at least one computer test tool. The cloud-based server can be further configured to send encrypted data to be received in the at least one computer test tool via the communication network and the at least one communication device.

Furthermore, in embodiments, the at least one computer test tool is further configured to decrypt the encrypted data sent from the cloud-based server. The data sent from the cloud-based server can be encrypted using a private key associated with the cloud-based server and is decrypted in the at least one computer test tool using a public key associated with the cloud-based server. The at least one computer test tool can be further configured to cache test data resulting from one or more diagnostic tests until the at least one computer test tool establishes data communication with the at least one communication device. The at least one computer test tool can establish data communication with the at least one communication device from a communication protocol selected from one of: BLUETOOTH®, WiFi, USB (Universal Serial Bus) coupling, and NFC (Near Field Communication).

Additionally, in embodiments, the at least one communication device can further be configured to cache encrypted test data received from the at least one computer test tool until communication is established between the at least one communication device and the cloud-based server. The at least one communication device can be selected from the group consisting of: smart phone devices and tablet devices.

In embodiments, the computer test tool can transmit to the at least one communication device multiple copies of the test data, each copy being associated with the same identification tag that identifies the associated test data. In response to receiving a copy of the test data, the cloud-based server can send an acknowledgment of receipt of the identified test data to the computer test tool. In response to receipt of the acknowledgment of receipt, the computer test tool can transmit a message to the at least one communication device with instructions to delete all copies of the test data having the identification tag associated thereto.

Further, in embodiments, the cloud-based server can transmit to the at least one communication device multiple copies of control or configuration data, each copy being associated with the same identification tag that identifies the associated control or configuration data. In response to receiving a copy of the test data, the computer test tool can send an acknowledgment of receipt of the identified control or configuration data to the cloud-based server. In response to receipt of the acknowledgment of receipt, the cloud-based server can transmit a message to the at least one communication device with instructions to delete all copies of the control or configuration data having the identification tag associated thereto.

In addition, in embodiments, the at least one computer test tool and the cloud-based server can be further configured to associate the data to be exchanged with the at least one communication device with an associated expiration time that indicates a time after which any copy of the diagnostic data stored by any of the at least one computer test tool, the at least one communication device or the cloud-based server is designated to be deleted. The at least one computer test tool, the at least one communication device, and the cloud-based server can further be configured to delete any copy of stored or received data that has an associated expiration time that is later than a current time.

In further optional aspects, a computer test tool for communicating test data is described. The computer test tool includes a memory configured to store executable instructions, and a processor disposed in communication with the memory, wherein the processor upon execution of the instructions is configured to perform one or more diagnostic tests on a computer network and output associated test data, cache the test data, encrypt the test data, and transmit the encrypted test data to a communication device, wherein the transmitted encrypted test data is configured to be decrypted by a cloud-based server coupled to the communication device.

In embodiments, the computer test tool can receive encrypted data from the cloud-based server via the communication network and the at least one communication device. The computer test tool can further be configured to decrypt the encrypted data received from the cloud-based server. The data received from the cloud-based server can be encrypted using a private key associated with the cloud-based server and can be decrypted in the computer test tool using a public key associated with the cloud-based server. The computer test tool can cache the test data until the computer test tool establishes data communication with the at least one communication device.

In additional optional aspects, a cloud-based server for providing data communication is described. The cloud-based server includes a memory configured to store executable instructions, and a processor disposed in communication with the memory, wherein the processor upon execution of the instructions is configured to receive encrypted test data from a communication device upon establishment of communication between the communication device and the cloud-based server via a communication network, wherein the test data is captured during a diagnostic test performed in a computer test device, cached and encrypted in the computer test device, configured to be decrypted in the cloud-based server, and transmitted to the communication device upon establishment of communication between the communication device and the computer test device. The processor is further configured, upon execution of the instructions, to decrypt the encrypted test data.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
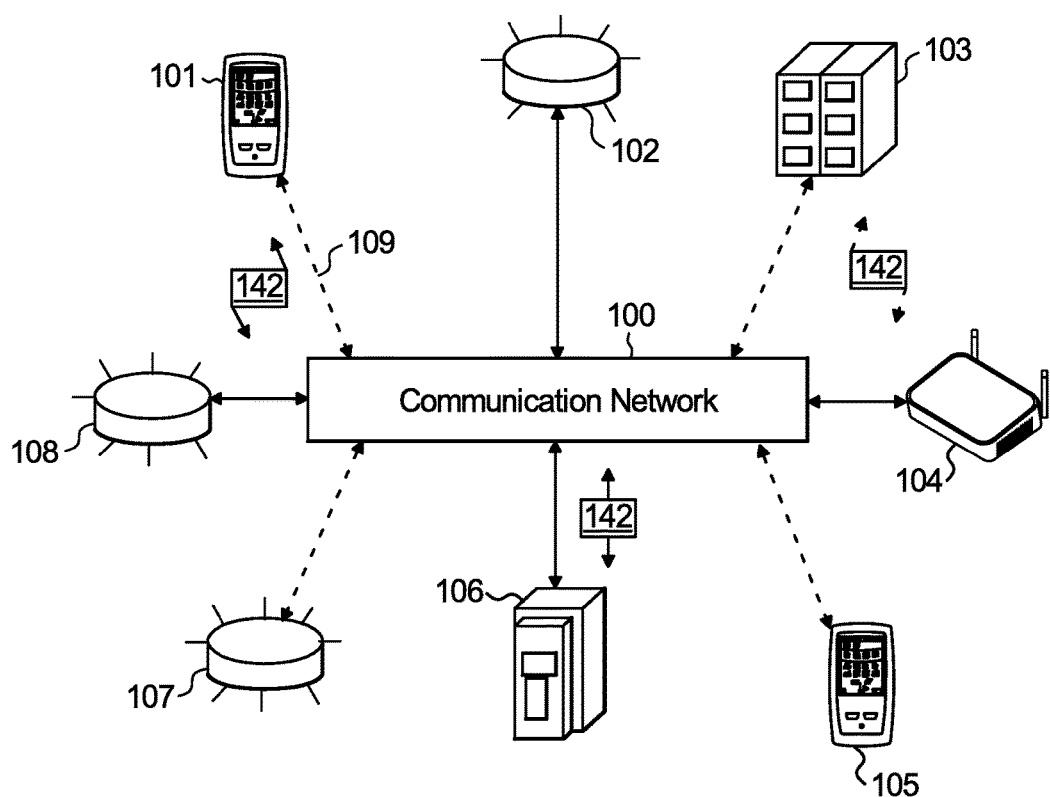
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected via links 109 by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
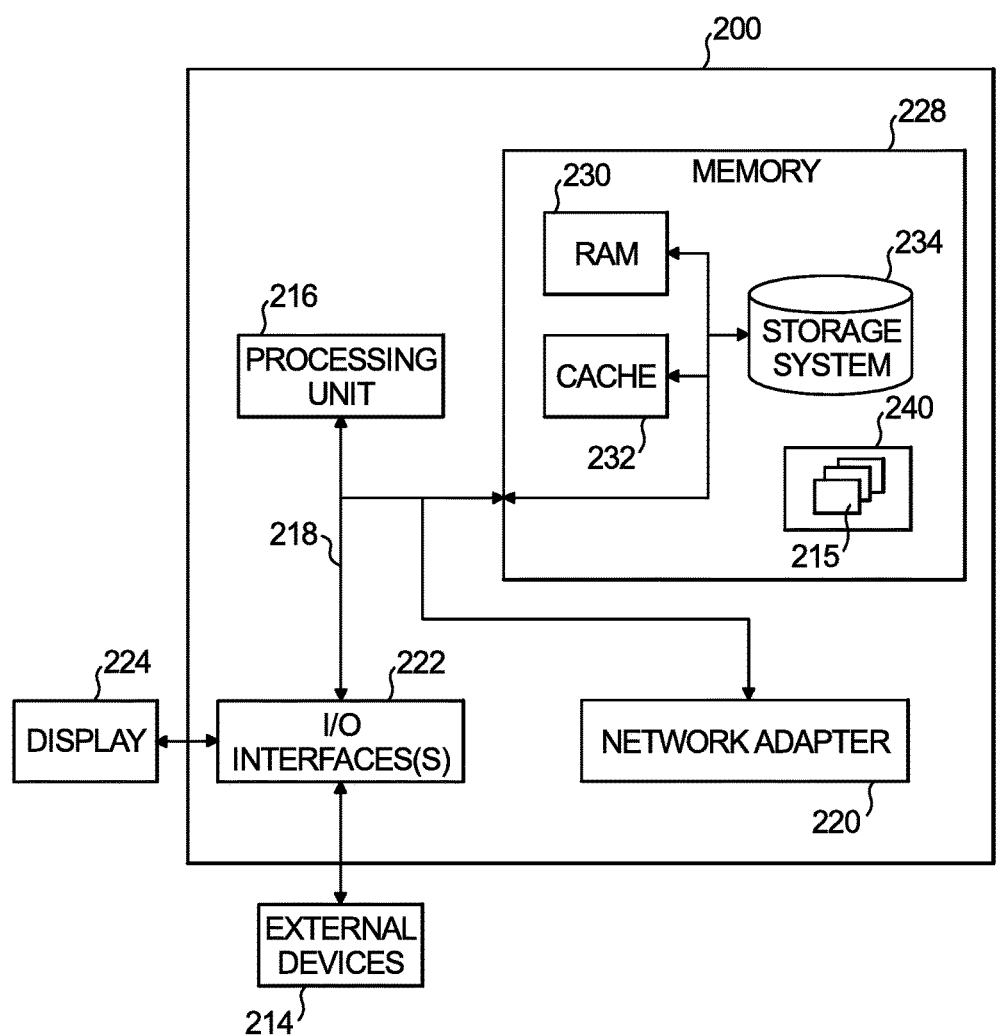
FIG. 2 illustrates an example network device/node.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

In the description that follows, certain embodiments may be described with reference to acts and symbolic representations of operations that are performed by one or more computing devices, such as the computing system environment 200 of FIG. 2. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
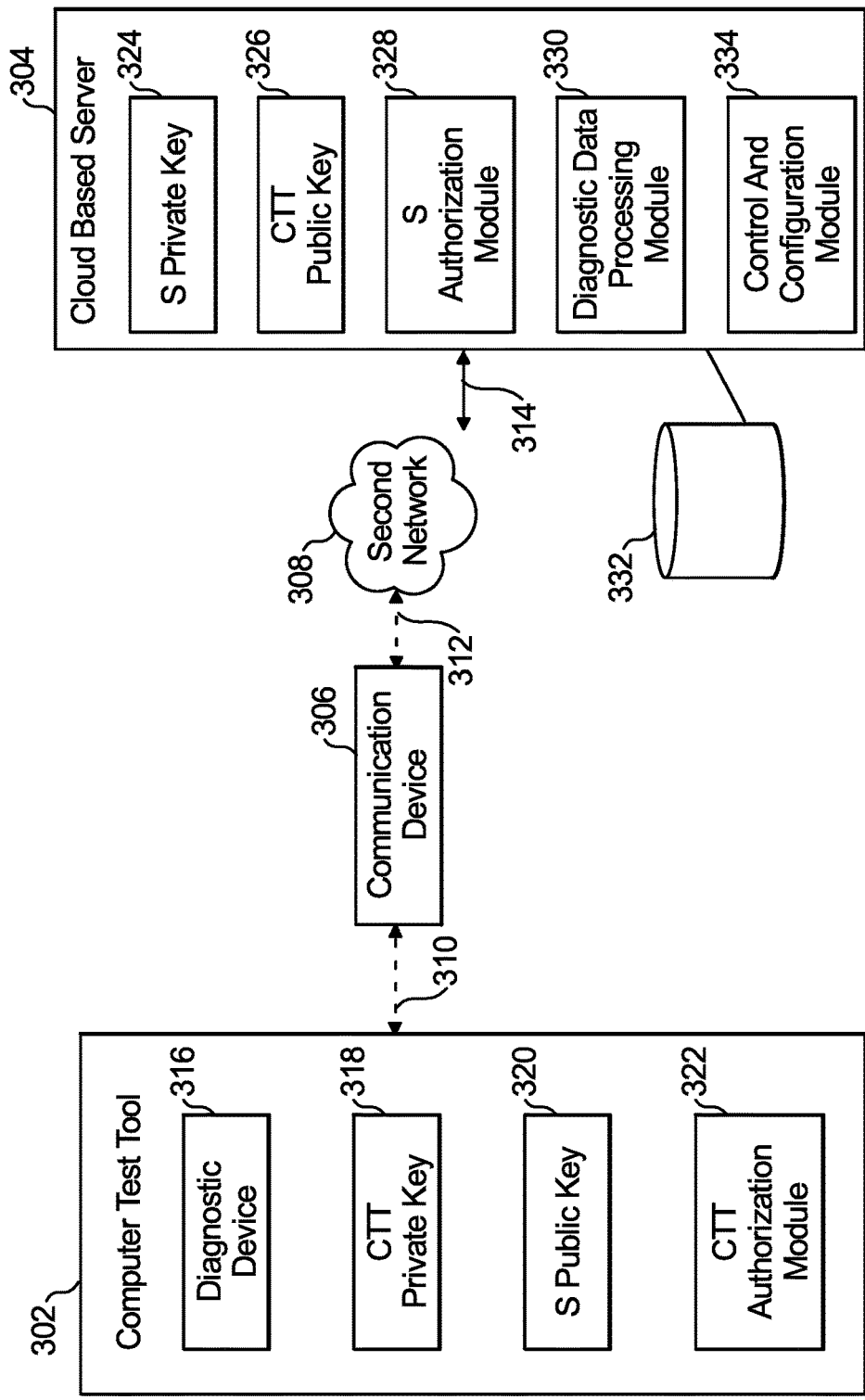
FIG. 3 is a flow diagram that illustrates a cloud-assisted diagnostic system in accordance with the disclosure.
Figure 4:
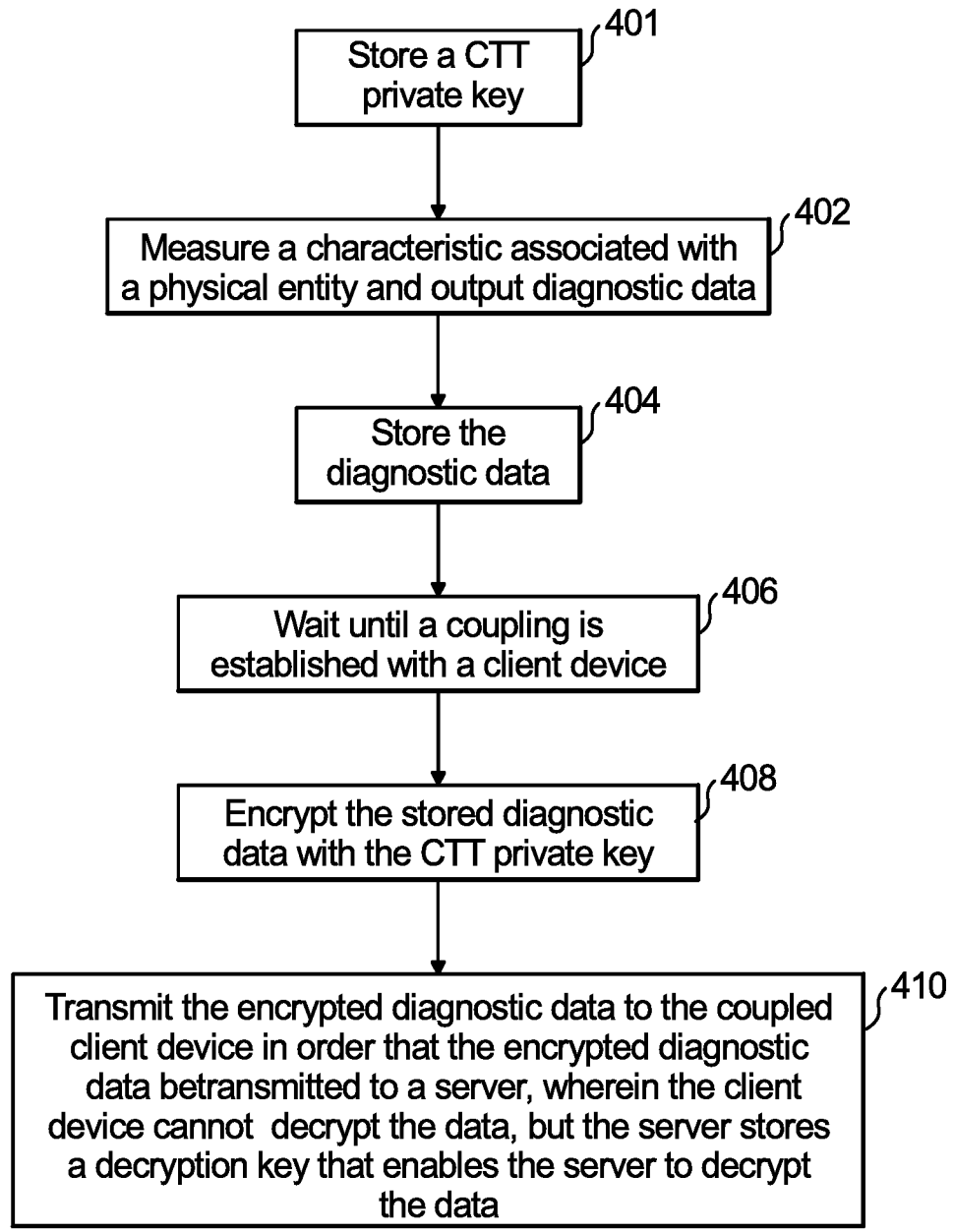
FIG. 4 is a flowchart illustrating a method performed by a computer test tool to securely transmit diagnostic data in accordance with the disclosure.
Figure 5:
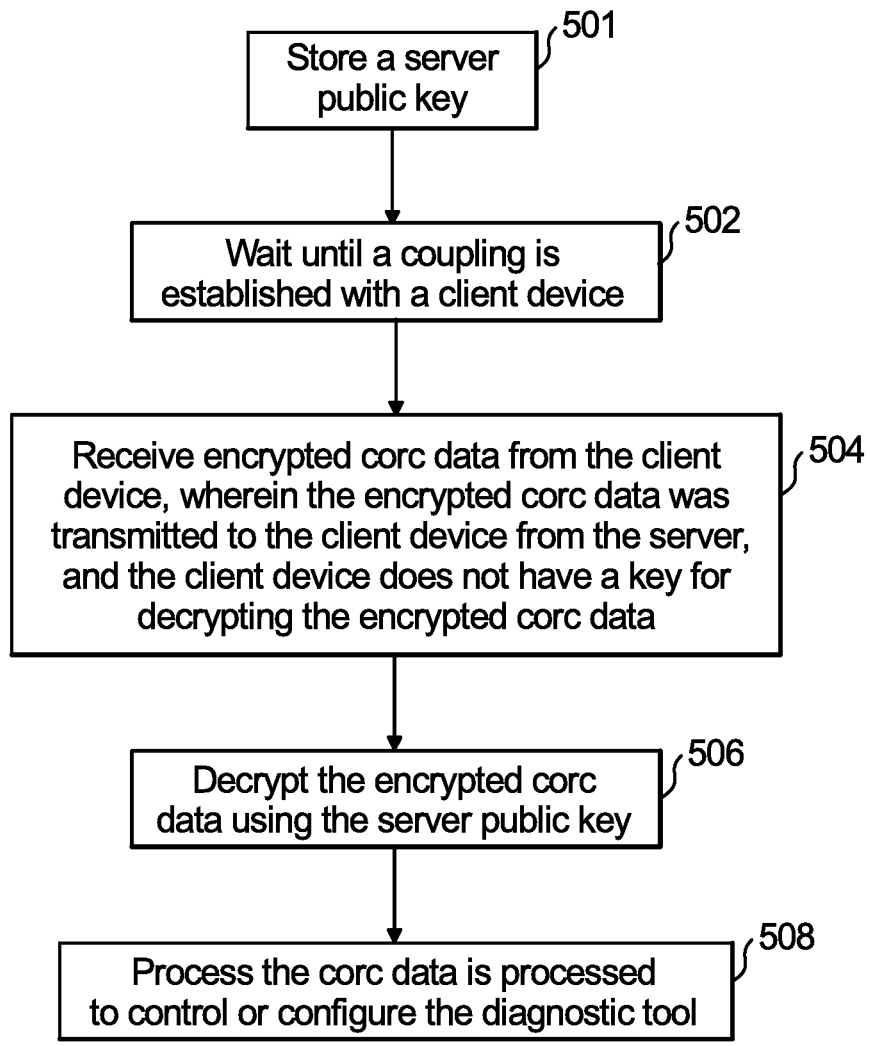
FIG. 5 is a flowchart illustrating a method performed by a computer test tool to securely receive control and configuration data in accordance with the disclosure.

With the exemplary communication network 100 (FIG. 1) and computing device 200 (FIG. 2) being generally shown and discussed above, description of certain illustrated embodiments of the present invention will now be provided. With reference now to FIGS. 3-5, a cloud-assisted diagnostic system 300 is generally shown in which a computer test tool 302 communicates indirectly with a cloud based server 304 via a communication device 306, wherein the communications between the computer test tool 302 and the server 304 are secured to prevent the communication device 304 from accessing content of the communications, and further to prevent counterfeit messages from being sent to the computer test tool 302 and/or the server 304.

The computer test tool 302 and the communication device 306 can be respective computer systems that each function as nodes (e.g., nodes 101-105, 107, or 108) of a first network that can be configured similarly to communication network 100 shown in FIG. 1. The computer test tool 302 and the communication device 306 communicate with one another via at least one first communication link 308. Similarly, the server 304 is a computer system that functions as a node (e.g., node 106) and the communication device 306 functions as a node (e.g., nodes 101-105, 107, or 108) of a second network 308 that can be configured similarly to communication network 100.

Public-key encryption thus uses an asymmetric key algorithm, where a key used by one device to perform either encryption or decryption is not the same as the key used by another device in the counterpart operation. Each device involved in two-way communication using public-key encryption is provided with a pair of cryptographic keys—a public encryption key and a private decryption key. The public key can be widely distributed, while the private key is known only to its proprietor. The keys are related mathematically, but the parameters are chosen so that calculating the private key from the public key is unfeasible.

The computer test tool 302, the communication device 306, and the server 304 can each be configured similarly to the network computing device 200 shown in FIG. 2, such as to include a processing unit 216, a network adapter 220, an I/O interface 222, and memory 228. The first, second, and third communication links 310, 312, 314 can each include a single or multiple wired and/or wireless links. In embodiments, some of these links use near-field communication, such as radio frequency identification (RFID), BLUETOOTH®, infrared communication, or the like. In embodiments, the second network 308 includes the Internet.

The computer test tool 302 can be a mobile or fixed device that includes a diagnostic device 316 that includes one or more sensors to measure a characteristic of a physical entity, such as electrical characteristics of a signal or power source, temperature, an exerted force, etc. The diagnostic device 316 outputs, in conjunction with analog-to-digital (A/D) conversion as needed, diagnostic data that indicates at least one value associated with the measurement.

The diagnostic data output by the diagnostic device 302 is stored in a storage device, such as memory 228. For example, the output diagnostic data may be cached or stored (e.g., in cache 232 or storage system 234) prior to being submitted to the communication device 306. Additionally, the computer test tool 302 stores (e.g., in memory 228) a computer test tool (CTT) private key 318 for encrypting diagnostic data transmitted by the computer test tool 302, e.g., to client 306. The computer test tool 302 further stores a server (S) public key 320 associated with the server 304 for decrypting messages received from the server 304. The CTT private key 318 and S public key 320 are discussed in greater detail below.

Upon request and/or upon establishment of the communication link 310, the computer test tool 302 can transmit (e.g., via network adapter 220) the diagnostic data to a communication device 306 coupled to the computer test tool 302 via communication link 310.

The computer test tool 302 includes an authentication module 322 (e.g., a program module 215 stored by memory 228 of the server 304) that processes messages exchanged (e.g., received from or transmitted to) with communication device 306 to authenticate that messages received are sent from the server 304 and that messages transmitted to the server 304 were sent by the computer test tool 302.

The communication device 306 can be a fixed or portable device (e.g., phone, tablet, or laptop) that functions as an intermediary to facilitate exchange of messages between the computer test tool 302 and the server 304. In an embodiment, the communication device 306 can function as a hotspot that provides WiFi service to the computer test tool 302, allowing the computer test tool 302 to communicate with the server 304 via WiFi. In this embodiment, the data transmitted to or from the computer test tool 302 is routed toward the destination by communication device 306. The communication device 306 in this embodiment includes hardware and/or software (e.g., program modules 215) that enables it to function as a hotspot.

In another embodiment, the computer test tool 302 is tethered to the communication device 306, wherein a communication link 310 is a tethered link that includes, for example, a cable (e.g., USB or Ethernet) or wireless near-field communication. The communication device 306 acts as an intermediary between the computer test tool 302 and the server 324, including exchanging data with the computer test tool 302 via communication link 310, and exchanging data with the server 304 via a communication 312 and the Internet. The communication device 306 in this embodiment includes hardware and/or software (e.g., program modules 215) that enables it to receive and store diagnostic data from the computer test tool 302 when communication link 310 is operational, and transmit the stored diagnostic data to the server 304 when communication link 312 is operational. In an embodiment, when both the communication links 310 and 312 are operational, the communication device 306 can forego storing the diagnostic data.

The server 304 is a web server that communicates with one or more communication devices 306 by coupling (e.g., via network adapter 220) to the second network 308 via communication link 314. The communication link 314, which can be wired, wireless, or a combination thereof, can be stable and readily available during operation times for communicating with one of the communication devices 306. Additionally, the server 304 can be readily available for communicating with communication devices 306 to receive, process, and or store diagnostic data, and to send messages, e.g., control or configuration (corc) messages, to the computer test tool 302. Operation times can include, for example, designated times of the day or week, or any time of the day or week (24/7) other than times when there is a malfunction or scheduled maintenance.

The server 304 stores (e.g., in memory 228) an S private key 324 for encrypting diagnostic data transmitted by the server 304, e.g., to client 306. The server 304 further stores at least one CTT public key 326 associated with the respective one or more computer test tools 302 for decrypting messages received from the computer test tools 302. The server 304 includes an authentication module 328 (e.g., a program module 215 stored by memory 228 of the server 304) that processes messages exchanged with communication device 306 to authenticate that messages received are sent from the computer test tool 302 and that messages transmitted to the computer test tool 302 were sent by the server 304.

The server 304 further includes a diagnostic data processing module 330 (e.g., a program module 215 stored by memory 228 of the server 304) that processes the diagnostic data and/or stores the diagnostic data in storage device 332. Storage device 332 can be included in or peripheral to the server 304. The server 304 further includes a control and configuration module 334 (e.g., a program module 215 stored by memory 228 of the server 304) that generates control and/or configuration data to control and configure the computer test tools 302.

In operation, the communication device 306 communicates with the second network 308 using a second communication link 310, and the server 304 communicates with the second network 308 using a third communication link 312. As indicated by the dotted lines, communication link 310 can be intermittent, such that the computer test tool 302 and the communication device 306 can selectively be disconnected so that the link 310 is broken, after which it can be reestablished. Similarly, as indicated by the dotted lines, communication link 312 can be intermittent, such that the communication device 306 can selectively be disconnected from the communication with the second network 308 so that the link 312 is broken, after which it can be reestablished.

In an exemplary embodiment, the first communication link is a single near-field or wired communication link, such as using either blue-tooth communication or a USB cable, with the first network including only the linked computer test tool 302 and communication device 306. The computer test tool 302 performs a diagnostic test and stores associated diagnostic data in local memory of the computer test tool 302 before a time t1. The computer test tool 302 and the communication device 306 can be coupled via the first communication link 310 at a time t2. The communication device 306 is a mobile phone or tablet or laptop that can couple to the second network 308 at a time t3 for communicating with the server 304. The server 304 is coupled to the second network 308 via a stable connection so that it is available to provide a service to one or more computer test tools 302. In an embodiment, t1, t2, and/or t3 can be in spaced chronological order (i.e., spaced from one another in time.)

In other words, the computer test tool 302 can perform one or more diagnostic tests and store associated diagnostic test data in local storage, all of which occur before time t1. A user holding the communication device 306 can come close to the computer test tool 302 at a later time t2 to couple the communication device 306 to the computer test tool 302 using near-field communication. The diagnostic data, or a copy thereof, can be transferred at time t2 to the communication device 306 and stored temporarily by the communication device 306. At a later time t3, the communication device 306 can couple to the second network 308 and transfer the diagnostic data to the server 304. In an embodiment, the computer test tool 302 can be coupled to the communication device 306 via the first network (the first communication link 310) at time t1, so that t1 and t2 can be nearly at the same time. In an embodiment, the communication device 306 can be coupled to the second network 308 at time t2, so that t2 and t3 can be nearly at the same time.

Data exchange via the communication links 310, 312 when the communication device 306 is used as a hotspot or tethered can be vulnerable to infiltration, such as by a device posing as communication device 306 that is transmitting fake or counterfeit data. The diagnostic system 300 is particularly vulnerable to the threat of transmission of fake or counterfeit data since the data transmitted to the computer test tool 302 or the server 304 can be stored by the communication device 306. Computer test tool 302 includes the CTT authentication module 322 that verifies that data received from the communication device 306 originated from the server 304, and authenticates data sent from the computer test tool 302. Similarly, the server 304 includes S authentication module 328 (described below) that verifies that the data received from the communication device 306 originated from the computer test tool 302, and authenticates data sent from the server 304.

With reference now to FIGS. 4-8, shown are flowcharts demonstrating implementation of the various exemplary embodiments. It is noted that the order of operations shown in FIGS. 4-8 is not required, so in principle, the various operations may be performed out of the illustrated order. Also certain operations may be skipped, different operations may be added or substituted, or selected operations or groups of operations may be performed in a separate application following the embodiments described herein.

FIG. 4 shows a flowchart of operations performed in accordance with a method of the disclosure when transmitting diagnostic data from the computer test tool 302 to a communication device 306. At operation 401, the CTT private key 318 is stored. At operation 402, the diagnostic device 316 measures a characteristic associated with a physical entity and outputs diagnostic data. At operation 404, diagnostic data output by the diagnostic device 316 is stored by the computer test tool 302 (e.g., in cache 232 or storage system 234). At operation 406, a wait loop is performed until a trigger occurs, wherein the trigger can include, for example, establishment of coupling the computer test tool 302 and a communication device 306 via communication link 310. The trigger may further include or require, for example, a request submitted by either of the computer test tool 302 and the communication device 306, or a combination thereof. At operation 408, stored diagnostic data to be transferred is encrypted by the CTT authentication module 322 using the CTT private key 318. At operation 410, the encrypted diagnostic data is transmitted to the coupled communication device 306 in order that the encrypted diagnostic data be transmitted via the communication device 306 to the server 304, wherein the communication device 306 cannot decrypt the data, but the server 304 stores a decryption key (e.g., CTT public key) that enables the server 304 to decrypt the data.

FIG. 5 shows a flowchart of operations performed in accordance with a method of the disclosure when receiving control and/or configuration data from the server 304 by the computer test tool 302. At operation 501, the S public key 318 is stored. At operation 502, a wait loop is performed until a trigger occurs, wherein the trigger can include, for example, establishment of coupling the computer test tool 302 and a communication device 306 via communication link 310. The trigger may further include or require, for example, a request submitted by either of the computer test tool 302 and the communication device 306, or a combination thereof. At operation 504, encrypted control and/or configuration data is received from the coupled communication device 306, wherein the encrypted control and/or configuration data was transmitted to the communication device 306 from the server 304, and the communication device 306 does not have a key for decrypting the encrypted control and/or configuration data. At operation 506, the encrypted control and/or configuration data is decrypted by the CTT authentication module 322 using the S public key 320. At operation 508, the control and/or configuration data is processed to control or configure (such as to brick (disable), unbrick (re-enable, update) the computer test tool 302.

Figure 6:
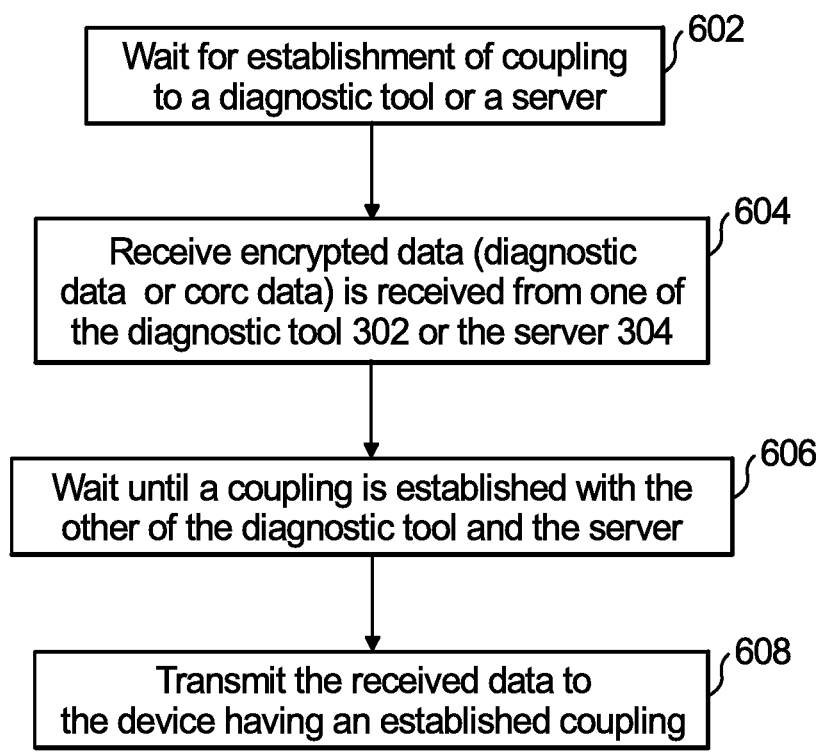
FIG. 6 is a flowchart illustrating a method performed by a communication device to securely exchange data with a computer test tool or a server in accordance with the disclosure.

FIG. 6 shows a flowchart of operations performed in accordance with a method of the disclosure when exchanging data by the communication device 306 with the computer test tool 302 or the server 304. At operation 602, a wait loop is performed until a trigger occurs, wherein the trigger can include, for example, establishment of coupling of one of the computer test tool 302 and a communication device 306 via communication link 310, or the communication device 306 and the server 304 via communication link 312. The trigger may further include or require, for example, a request submitted by either of the computer test tool 302, server 304, and the communication device 306, or a combination thereof. At operation 604, encrypted data (diagnostic data or control and/or configuration data) is received from one of the computer test tool 302 or the server 304. The communication device 306 is incapable of decrypting the data received.

At operation 606, a wait loop is performed until a trigger occurs, wherein the trigger can include, for example, establishment of coupling of the other of the computer test tool 302 and a communication device 306 via communication link 310, or the communication device 306 and the server 304 via communication link 312. The trigger may further include or require, for example, a request submitted by either of the computer test tool 302, server 304, and the communication device 306, or a combination thereof. At operation 608, the data received is transmitted to the other of the computer test tool 302 and the server 304 that has an established coupling. The data can be decrypted by the computer test tool 302 or the server 304 that received the data using a public key stored for that device.

Figure 7:
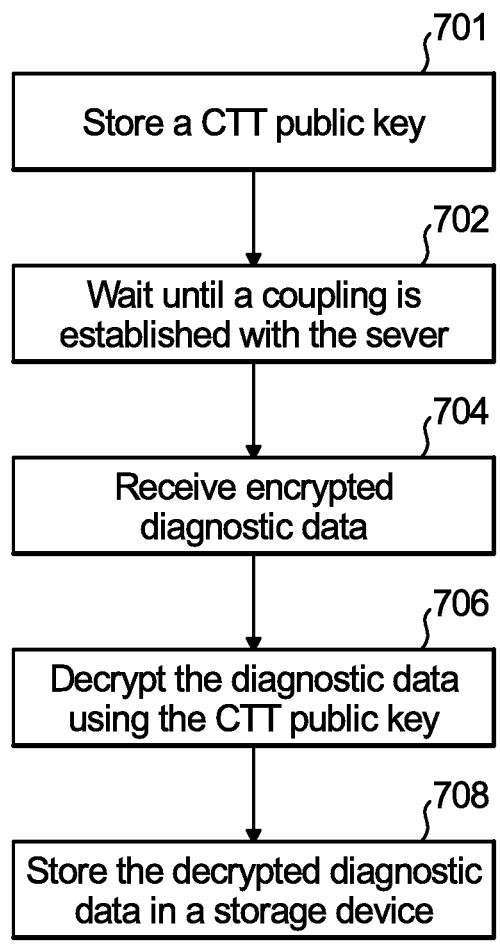
FIG. 7 is a flowchart illustrating a method performed by a server to securely receive diagnostic data in accordance with the disclosure.

FIG. 7 shows a flowchart of operations performed in accordance with a method of the disclosure when receiving diagnostic data by the server 304 with the communication device 306. At operation 701, a CTT public key 318 is stored. At operation 702, a wait loop is performed until a trigger occurs, wherein the trigger can include, for example, establishment of coupling of the communication device 306 and the server 304 via communication link 312. The trigger may further include or require, for example, a request submitted by either of the server 304 and the communication device 306, or a combination thereof. At operation 704, encrypted diagnostic data is received. The encrypted diagnostic data was transmitted to the server 304 by the communication device 306, wherein the communication device 306 is incapable (e.g., does not have a public key) of decrypting the encrypted diagnostic data. At operation 706, the diagnostic data is decrypted by the S authentication module 328 using the CTT public key 320. At operation 708, the decrypted diagnostic data is processed by the diagnostic data processing module 330 and/or stored in storage device 332.

Figure 8:
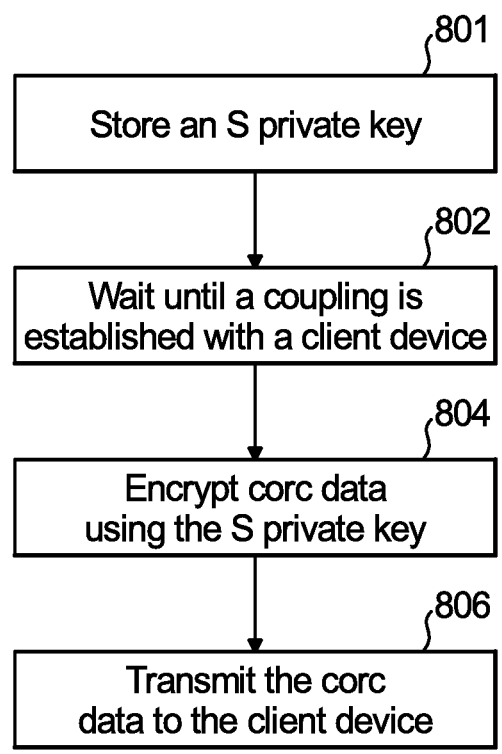
FIG. 8 is a flowchart illustrating a method performed by a server to securely transmit control and configuration data in accordance with the disclosure.

FIG. 8 shows a flowchart of operations performed in accordance with a method of the disclosure when transmitting control and/or configuration data by the server 304 to the computer test tool 302 via the communication device 306. At operation 801, the S private key 324 is stored. At operation 802, a wait loop is performed until a trigger occurs, wherein the trigger can include, for example, establishment of coupling of the communication device 306 and the server 304 via communication link 312. The trigger may further include or require, for example, a request submitted by either of the server 304 and the communication device 306, or a combination thereof. At operation 804, control and/or configuration data, e.g., generated by the control and configuration module 334, is encrypted by the S authentication module 328 using the S private key 324. At operation 804, the encrypted control and/or configuration data is transmitted to the communication device 306, wherein the communication device 306 cannot decrypt the encrypted control and/or configuration data, but the computer test tool 302 stores a decryption key (e.g., S public key) that enables the computer test tool 302 to decrypt the encrypted control and/or configuration data.

Figure 9:
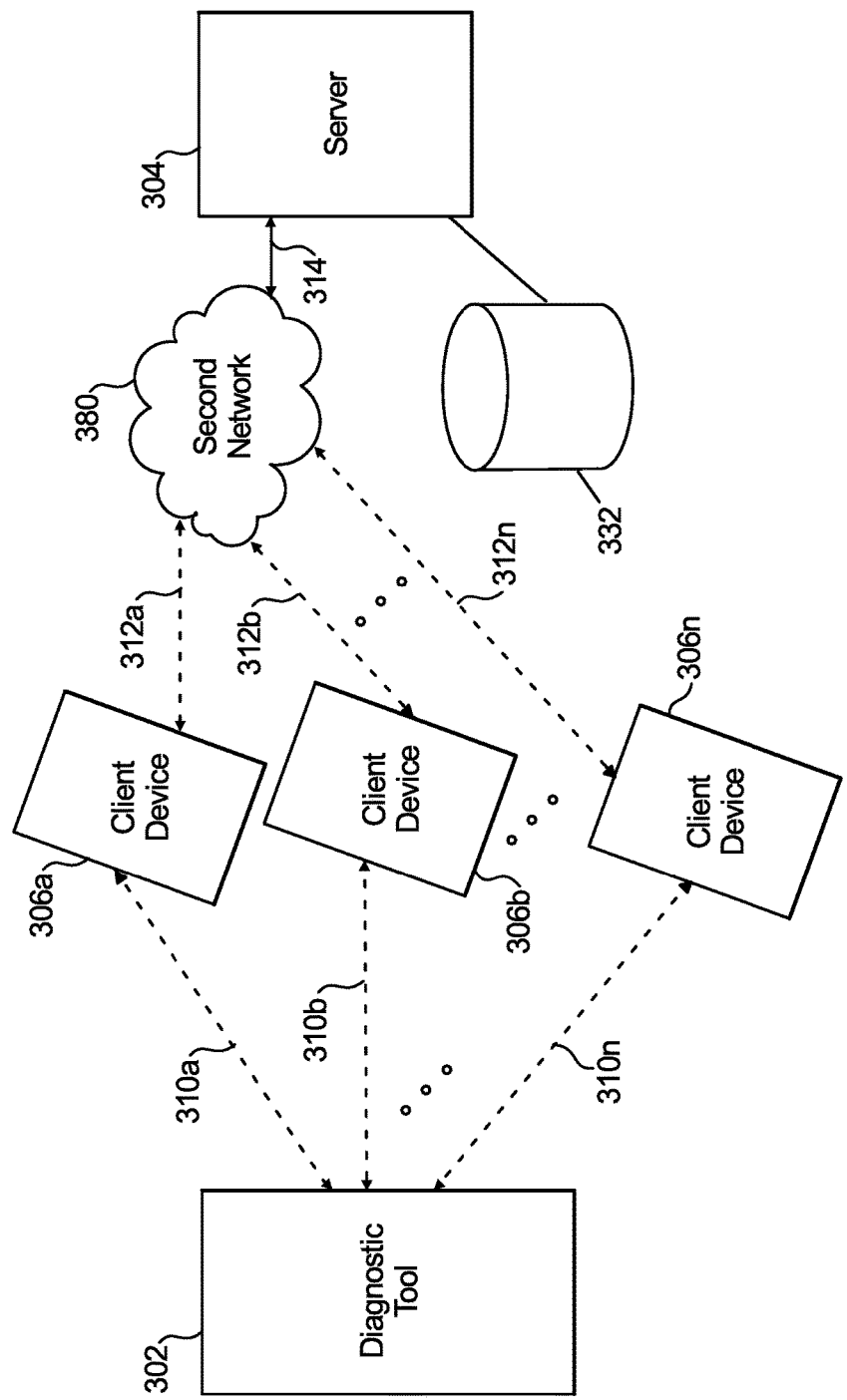
FIG. 9 is a flow diagram that illustrates a cloud-assisted diagnostic system having multiple communication devices in accordance with the disclosure.

FIG. 9 shows a flow diagram of another embodiment of the disclosure in which multiple communication devices 306a-306n are provided. The communication devices 306a-306n are coupled by respective communication links 310a-310n to the computer test tool 202, and via respective communication links 312a-312n to the server 304.

In operation, when the CTT authentication module 322 or the S authentication module 328 encrypts a data message, it appends a non-encrypted identification tag (e.g., an alphanumeric tag) to the message. Multiple copies of the message can be transmitted to multiple devices of the communication devices 306a-306n. In an embodiment, when one of the copies of the message is received by the server 304, the server 304 can decrypt, process, and/or store only one of the messages, whereas the other copies can be ignored and/or deleted. In an embodiment, when the first copy of the message is received by the server 304, the server 304 can send an encrypted acknowledgement to the computer test tool 302. The server 304 and/or the computer test tool 302, e.g., in response to the acknowledgement, can send an unencrypted "delete all duplicates" (DAD) message to the communication devices 306a-306n to which the computer test tool 302 is able to couple. The DAD message instructs the communication devices 306a-306n to delete any copies of the data message having the ID that it is storing or processing. Accordingly, the communication devices 306a-306n that respond to the DAD message will no longer store or transmit copies of the message that was already received by the server 304.

Similarly, in an embodiment, when one of the copies of the message is received by the computer test tool 302, the computer test tool 302 can decrypt, process, and/or store only one of the messages, whereas the other copies can be ignored and/or deleted. In an embodiment, when the first copy of the message is received by the computer test tool 302, the computer test tool 302 can send an encrypted acknowledgement to the server 304. In response to the acknowledgement, the server 304 sends an unencrypted DAD message to selected communication devices 306a-306n that have a tracked history of coupling with the computer test tool. In response to receiving the DAD message, the selected communication devices 306a-306n delete any copies of the data message having the ID that is stored or being processed by that device 306. Accordingly, the selected communication devices 306a-306n will no longer store or transmit copies of the message that was already received by the computer test tool 302. In this embodiment, the server 304 can track and store identification of communication devices 306 that have a history of exchanging data messages with the computer test tool 302.

In an embodiment, when the computer test tool 302 or the server 306 encrypts data, it adds a one-use indicator to the data message. The one-use indicator indicates to the module that decrypts the data (e.g., the CTT authentication module 322 or the S authentication module 328) that the data can only be decrypted or processed one time.

**For example, the server 306 can send a one-use message to the computer test tool 302 to perform a special function, turn on, turn off, or to brick itself, until a subsequent message is received. One-use messages are encrypted with a sequence number so that the one-use message cannot be reused, e.g., to turn a computer test tool 302 on or off. The encrypted sequence number prevents storage and reuse of a single legitimate one-use message. For example, when a user purchases a week's use of a particular special feature, the server 306 can send the computer test tool 302 a one-use "turn on this feature message" that is encrypted with a sequence number. When the week runs out, the computer test tool 302 automatically shuts off the feature. The sequence number prevents the user from re-using the original message (e.g., replaying the original message to the computer test tool 302) to gain another week of use of the special function.

In an embodiment the CTT authentication module 322 and the S authentication module 328 append "time to live" (TTL) information to the data messages exchanged by the computer test tool 302 and the server 304. The TTL information indicates an expiration date. When the expiration data associated with a data message passes, any communication device 306a-306n storing or processing the message deletes the message. Using TTL information to limit the lifespan of a message can decrease the chances that the same message could be sent more than one time via different paths through the communication links 310a-310n and/or 312a-312n.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system for providing data communication, comprising:
   at least one computer test tool configured to perform one or more diagnostic tests on a computer network and to generate associated test data;
   a plurality of communication devices that are each in communication with the at least one computer test tool via corresponding communication channels and in wireless communication with a communication network that is distinct from the computer network being tested and from the corresponding communication channels; and
   a cloud-based server in communication with the communication network;
   wherein the at least one computer test tool includes a processor that executes computer instructions to:
      encrypt the test data and append a non-encrypted identification tag of the test data to the encrypted test data;
      provide a copy of the encrypted test data having the identification tag to each of the plurality of communication devices over the corresponding communication channels; and
      in response to receiving from the cloud-based server an acknowledgment that the cloud-based server received the encrypted test data, provide an instruction to each of the plurality of communication devices to delete the encrypted test data having the identification tag;
   wherein each corresponding communication device of the plurality of communication devices includes a processor that executes computer instructions to:
      determine if the corresponding communication device is in communication with the cloud-based server over the communication network;
      in response to a determination by the corresponding communication device that the corresponding communication device is in communication with the cloud-based server, send the encrypted data from the corresponding communication device to the cloud-based server; and
      in response to receipt of the instruction from the at least one computer test tool by the corresponding communication device, delete the encrypted test data having the identification tag so that the corresponding communication device no longer sends the encrypted test data to the cloud-based server; and
   wherein the cloud-based server includes a processor that executes computer instructions to:
      decrypt the encrypted test data received from one of the plurality of communication devices; and provide the acknowledgement to the at least one computer test tool.

2. The system as recited in claim 1, wherein the test data is encrypted using a private key associated with the at least one computer test tool and decrypted in the cloud-based server using a public key associated with the at least one computer test tool.

3. The system as recited in claim 1, wherein the processor of the cloud-based server executes further computer instructions to send encrypted data to be received in the at least one computer test tool via the communication network and at least one of the plurality of communication devices.

4. The system as recited in claim 3, wherein the processor of the at least one computer test tool executes further computer instructions to decrypt the encrypted data sent from the cloud-based server.

5. The system as recited in claim 4, wherein the data sent from the cloud-based server is encrypted using a private key associated with the cloud-based server and is decrypted in the at least one computer test tool using a public key associated with the cloud-based server.

6. The system as recited in claim 1, wherein the processor of the at least one computer test tool executes further computer instructions to cache test data resulting from one or more diagnostic tests until the at least one computer test tool establishes data communication with at least one communication device of the plurality of communication devices.

7. The system as recited in claim 6, wherein the at least one computer test tool establishes data communication with the at least one communication device from a communication protocol selected from one of: BLUETOOTH®, WiFi, USB coupling, and NFC.

8. The system as recited in claim 1, wherein the processor of each corresponding communication device of the plurality of communication device executes further computer instructions to cache encrypted test data received from the at least one computer test tool until a communication is established between the corresponding communication device and the cloud-based server.

9. The system as recited in claim 1, wherein the plurality of communication devices are selected from the group consisting of: smart phone devices and tablet devices.

10. The system as recited in claim 3, wherein:
the processor of the cloud-based server executes further computer instructions to transmit to each of the plurality of communication devices a copy of control or configuration data, each copy being associated with a same identification tag that identifies the associated control or configuration data;
the processor of the computer test tool executes further computer instructions to, in response to receiving the control or configuration data, send an acknowledgment of receipt of the control or configuration data to the cloud-based server; and
the processor of the cloud-based server executes the further computer instructions to, in response to receipt of the acknowledgment of receipt, transmit a message to each of the plurality of communication devices with instructions to delete all copies of the control or configuration data having the identification tag associated thereto.

11. The system according to claim 1, wherein:
the processor of the at least one computer test tool executes further computer instructions to append an expiration time to the encrypted test data that indicates a time after which any copy of the encrypted test data stored by any of the plurality of communication devices is designated to be deleted; and
the processor of the cloud-based server executes further computer instructions to append to control or configuration data sent to the at least one computer test tool via the plurality of communication devices an expiration time that indicates a time after which any copy of the control or configuration data stored by any of the plurality of communication devices is designated to be deleted.

12. The system according to claim 11, wherein the at least one computer test tool, the plurality of communication devices, and the cloud-based server delete any copy of stored or received data that has an associated expiration time that is after a current time.

13. A computer test tool for communicating test data comprising:
a memory configured to store executable instructions; and
a processor disposed in communication with said memory, wherein said processor upon execution of the instructions performs actions, including:
perform one or more diagnostic tests on a computer network and generate associated test data;
cache the test data;
encrypt the test data;
append a non-encrypted identification tag to the encrypted test data, wherein the non-encrypted identification tag identifies the test data;
transmit a copy of the encrypted test data to a plurality of communication devices over communication links that are distinct from the computer network being tested, wherein the transmitted encrypted test data is configured to be decrypted by a cloud-based server in communication with at least one of the communication devices over a wireless network that is distinct from the communication links between the computer test tool and the plurality of communication devices and the computer network being tested; and
in response to receiving from the cloud-based server an acknowledgment that the cloud-based server received the encrypted test data, provide an instruction to each of the plurality of communication devices to delete the encrypted test data having the identification tag so that the plurality of communication devices no longer transmit the encrypted test data to the cloud-based server.

14. The computer test tool as recited in claim 13, wherein the computer test tool receives encrypted data from the cloud-based server via at least one of the plurality of communication devices.

15. The computer test tool as recited in claim 14, wherein the processor of the computer test tool executes further instructions to decrypt the encrypted data received from the cloud-based server.

16. The computer test tool as recited in claim 15, wherein the encrypted data received from the cloud-based server is encrypted using a private key associated with the cloud-based server, and the computer test tool decrypts the encrypted data using a public key associated with the cloud-based server.

17. The computer test tool as recited in claim 13, wherein the computer test tool caches the test data until the computer test tool establishes a communication link with at least one of the plurality of communication devices.

18. A cloud-based server for providing data communication, comprising:
a memory configured to store executable instructions; and
a processor disposed in communication with said memory, wherein said processor upon execution of the instructions performs actions, including:
encrypt control or configuration data that is associated with operation of a computer test device to perform a diagnostic test on a computer network;
transmit a copy of the control or configuration data to each of a plurality of communication devices via corresponding first communication connections for forwarding to the computer test device via second communication connections, wherein the first and second communication connections are distinct from the computer network being tested by the computer test device;
in response to receiving an acknowledgment that the computer test device received the control or configuration data, provide an instruction to each of the plurality of communication devices to delete the copies of the control or configuration data so that the plurality of communication devices no longer transmit the encrypted test data to the cloud-based server;
receive encrypted test data from at least one communication device of the plurality of communication devices upon establishment of communication of the at least one communication device with the cloud-based server via a corresponding first communication connection, wherein the test data is captured during the diagnostic test performed on the computer network by the computer test device, cached and encrypted in the computer test device to be decrypted in the cloud-based server, and transmitted by the computer test device to the plurality of communication devices upon establishment of a corresponding second communication connection between the plurality of communication devices and the computer test device; and decrypt the encrypted test data.

* * * * *